United States Patent
Ward et al.

(10) Patent No.: US 7,620,486 B2
(45) Date of Patent: Nov. 17, 2009

(54) SYSTEMS FOR PROVIDING AN AUTOMOBILE ELECTRONIC TRANSMISSION CONTROL MONITORING UNIT WITH A LATCHDOWN MECHANISM

(75) Inventors: Alan Richard Ward, Troy, MI (US); Roger Thomas Douglas, Waterford, MI (US); Michael Ray Lindsay, Commerce Township, MI (US); Jesse Mitchell Saier, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 384 days.

(21) Appl. No.: 11/738,061

(22) Filed: Apr. 20, 2007

(65) Prior Publication Data

US 2008/0262683 A1 Oct. 23, 2008

(51) Int. Cl.
*G06F 7/00* (2006.01)
*G06F 17/00* (2006.01)

(52) U.S. Cl. ............................ 701/51; 701/33; 701/36; 701/55; 477/125; 180/53.1

(58) Field of Classification Search .................. 701/51, 701/52, 55, 56, 64, 67, 33, 36; 477/78, 89, 477/125; 180/53.1
See application file for complete search history.

(56) References Cited

U.S. PATENT DOCUMENTS

| | | | | |
|---|---|---|---|---|
| 5,012,416 A | * | 4/1991 | Bulgrien et al. | ............... 701/67 |
| 5,611,245 A | * | 3/1997 | McKee | ..................... 74/336 R |
| 5,790,969 A | * | 8/1998 | McKee | ........................ 701/51 |
| 5,916,291 A | * | 6/1999 | McKee | ........................ 701/55 |

* cited by examiner

*Primary Examiner*—Gertrude Arthur Jeanglaud
(74) *Attorney, Agent, or Firm*—Ralph E. Smith

(57) ABSTRACT

The present disclosure provides systems for microprocessors to control a transmission power relay output with a latchdown mechanism in the event that either microprocessor decides it is appropriate to de-energize the relay. Advantageously, the present disclosure allows, for example, the transmission control to be performed by an existing dual microprocessor configuration instead of a custom-designed application specific integrated circuit (ASIC). The microprocessor-based software is more easily updated or changed to add functionality. Further, the present disclosure minimizes unique development with respect to electronic transmission control with a less complex design.

16 Claims, 3 Drawing Sheets

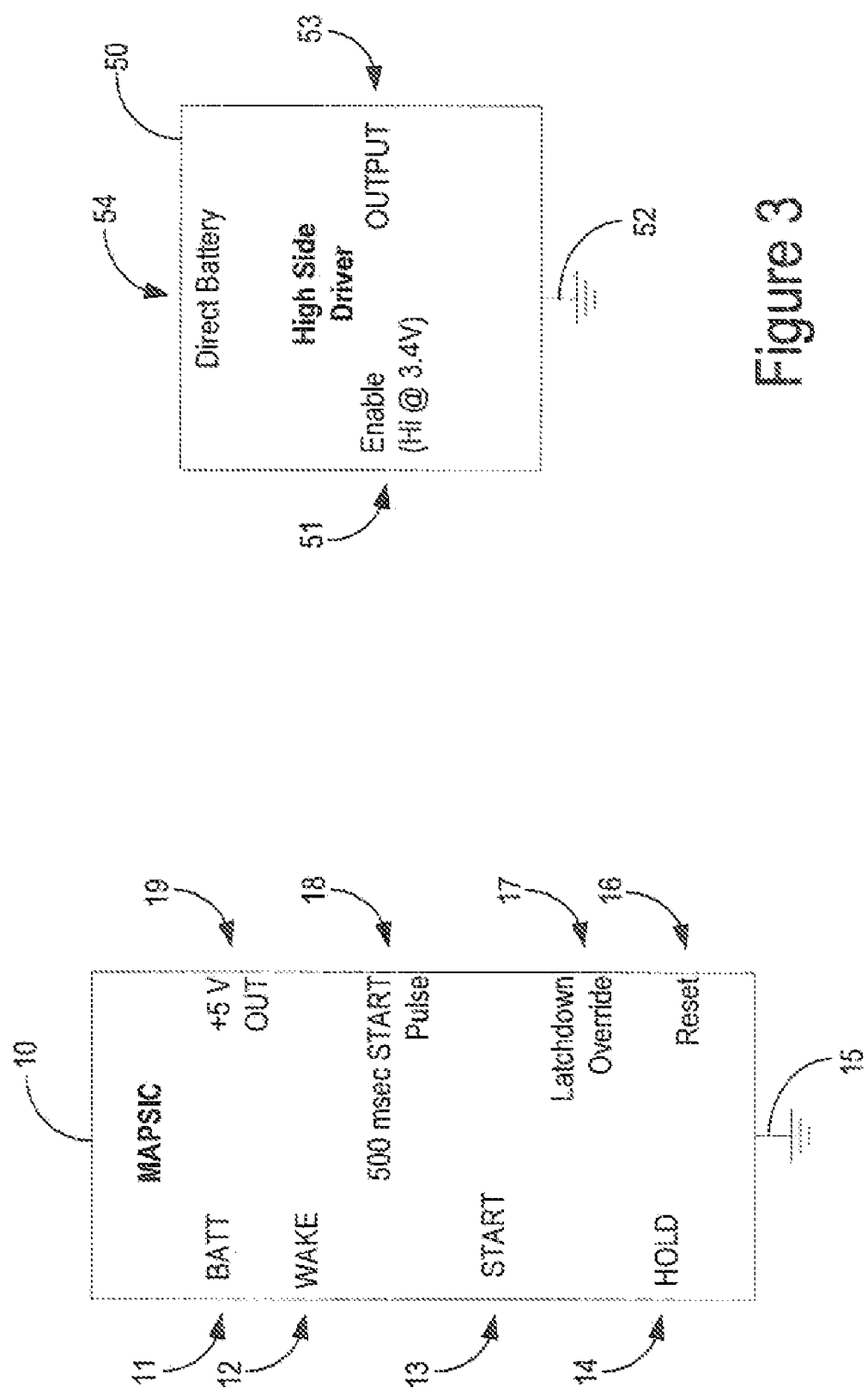

SYSTEMS FOR PROVIDING AN AUTOMOBILE ELECTRONIC TRANSMISSION CONTROL MONITORING UNIT WITH A LATCHDOWN MECHANISM

FIELD OF THE DISCLOSURE

The present disclosure relates generally to automobile transmission control systems, and more specifically, to systems for providing for microprocessors to control a transmission power relay output with a latchdown mechanism in the event that either microprocessor decides it is appropriate to de-energize the relay.

BACKGROUND OF THE DISCLOSURE

An electronic transmission control unit is a device that controls an automatic transmission. The transmission control unit generally uses sensors associated with the vehicle as well as data provided by an engine control unit to calculate how and when to change gears in the vehicle for optimum performance, fuel economy, and shift quality. With an electronic transmission control unit, an automatic transmission is able to achieve better fuel economy, reduced engine emissions, greater shift system reliability, improved shift feel, improved shift speed, and improved vehicle handling. The immense range of programmability offered by a transmission control unit allows the modern automatic transmission to he used with appropriate transmission characteristics for each application. Typically, an electronic transmission control unit includes an application specific integrated circuit (ASIC) or the like.

Traditionally, automobile transmission control units used custom-designed Application Specific Integrated Circuits (ASICs). One particular area where ASICs are used is to provide transmission control unit watchdog functionality, transmission relay power output control, undervoltage detection, and transmission delay counter and the associated logic. The watchdog functionality is included with the transmission control unit to ensure that the transmission control unit is functioning properly. For example, these ASICs can be configured to detect slow or fast timing over a watchdog window detect period. Additionally, these ASICs can control the output power of a transmission relay, provide reset and undervoltage detection, and the like. The transmission relay power output is used to energize solenoids in the transmission itself. Disadvantageously, these custom-designed ASICs have significant development costs, maintenance costs, and are complex to upgrade or add enhanced functionality to.

BRIEF SUMMARY OF THE DISCLOSURE

The present disclosure provides systems for providing microprocessors to control a transmission power relay output with a latchdown mechanism in the event that either microprocessor decides it is appropriate to de-energize the relay. These microprocessors along with other circuitry perform as a transmission control microprocessor monitoring unit operable to provide watchdog window detect functionality, transmission relay power output, undervoltage detect circuit, the transmission delay counter, and the associated logic in that device. Advantageously, the present disclosure allows, for example, the transmission control to he performed by an existing dual microprocessor configuration instead of a custom-designed application specific integrated circuit (ASIC). The microprocessor-based software is easily updated or changed to add functionality. Further, the present disclosure minimizes unique development with respect to electronic transmission control with a less complex design.

The transmission relay power output is controlled by microprocessors through a failsafe circuit that overrides and shuts down the relay under fault conditions including when a transmission microprocessor stops sending a proper watchdog signal/message to the failsafe microprocessor, and/or the failsafe microprocessor stops sending a proper watchdog signal/message to the transmission microprocessor. Once the relay has been shutdown from one of the fault conditions, the latchdown mechanism ensures that the relay is not reactivated until the ignition key is cycled through lock back to the on position regardless of other events that can occur daring vehicle operation.

In an exemplary embodiment of the present disclosure, a transmission power relay output circuit with a latchdown mechanism for automotive use includes a power supply integrated circuit connected to a power source, a first microprocessor, and a second microprocessor, a communications link for exchanging watchdog messages between the first and second microprocessors, a high side driver comprising an input from the first and second microprocessors, and an output coupled to a transmission relay, and a latchdown circuit connected to the power supply integrated circuit, the first and second microprocessors, and the high side driver, wherein the latchdown circuit includes a plurality of discrete components, wherein the first and second microprocessors and the latchdown circuit are configured to control the transmission relay in the event that one of the first and second microprocessors decides it is appropriate to de-energize the relay. The communications link is a Serial Peripheral Interface Bus. The first and second microprocessors reset one another and itself responsive to a software algorithm that contains third level protection functions. The first microprocessor is a 68HC08 and the second microprocessor is a Copperhead (CuHD). The Copperhead microprocessor detects an ignition key turn on and initiates a high side driver turn on routine accordingly. The transmission relay is de-energized responsive to a fault condition comprising one of when the first or second microprocessors stops sending a proper watchdog signal/message, and the latchdown circuit prevents re-energization of the relay until the next key on sequence. Once the transmission relay has been de-energized from one of the fault conditions, the relay is not reactivated until the ignition key is cycled through lock back to on even if the first or second microprocessor gets reset. The transmission relay is energized as long as the first microprocessor maintains an enable output, no latchdown signal is present, and the second microprocessor maintains a disabled output low. The first and second microprocessors are configured to perform a test by resetting, and wherein the resetting is performed fast enough that the relay remains energized.

In another exemplary embodiment of the present disclosure, a first and second microprocessor configured to control a transmission power relay output circuit with a latchdown mechanism for automotive use includes a Serial Peripheral Interface Bus communications link between the first and second microprocessors, a high side driver including an input from the first and second microprocessors, and an output coupled to a transmission relay, and a latchdown circuit connected to a power supply integrated circuit, the first and second microprocessors, and the high side driver, wherein the latchdown circuit includes a plurality of discrete components, wherein the Serial Peripheral Interface Bus communications link allows the first and second microprocessors to reset one another and itself responsive to whether the first and second microprocessors are operating properly, wherein the first and second microprocessors reset one another and itself responsive to a software algorithm that contains third level protection functions, and wherein the first and second microprocessors the latchdown circuit are configured to control a transmission relay and in the event that one of the first and second microprocessors decides it is appropriate to de-energize the relay. The first microprocessor is a 68HC08 and the second microprocessor is a Copperhead (CuHD). The Copperhead microprocessor detects an ignition key turn on and initiates a high side driver turn on routine accordingly. The transmission relay is de-energized responsive to a fault condition comprising one of when the first or second microprocessors stops sending a proper watchdog signal/message, and the latchdown circuit prevents re-energization of the relay until the next key on sequence. Once the transmission relay has been de-energized from one of the fault conditions, the relay is not reactivated until the ignition key is cycled through lock back to on even if the first or second microprocessors gets reset. The transmission relay is energized as long as the first microprocessor maintains an enable output, no latchdown signal is present, and the second microprocessor maintains a disabled output low. The first and second microprocessors are configured to perform a test by resetting, and wherein the resetting is performed fast enough that the relay remains energized.

BRIEF DESCRIPTION OF THE DRAWINGS

The present disclosure is illustrated and described herein with reference to the various drawings, in which like reference numbers denote like system components, and in which:

FIG. 2 is a partial pin diagram of a Multi-voltage Automotive Power Supply Integrated Circuit according to an exemplary embodiment of the present disclosure;

FIG. 3 is a pin diagram of a high side driver according to an exemplary embodiment of the present disclosure;

DETAILED DESCRIPTION OF THE DISCLOSURE

Figure 1:
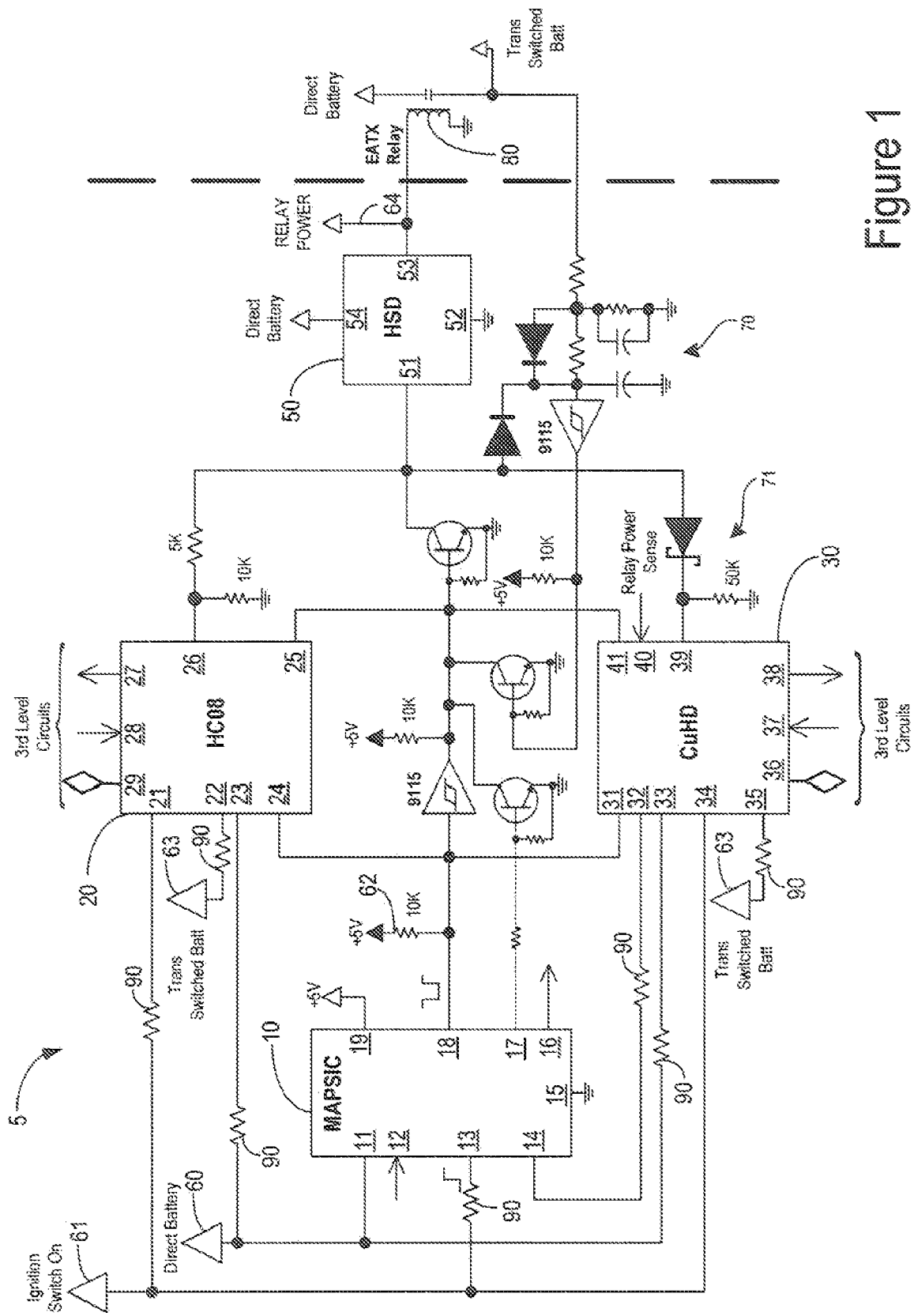
FIG. 1 is a circuit diagram of an exemplary embodiment of the present disclosure for providing a transmission control microprocessor monitoring unit.

The present disclosure provides systems for providing microprocessors to control a transmission power relay output with a latchdown mechanism in the event that either microprocessor decides it is appropriate to de-energize the relay. These microprocessors along with other circuitry perform as a transmission control microprocessor monitoring unit operable to provide watchdog window detect functionality, transmission relay power output, undervoltage detect circuit, transmission delay counter, and the associated logic in that device. Advantageously, the present disclosure allows, for example, the transmission control to be performed by an existing dual microprocessor configuration instead of a custom-designed application specific integrated circuit (ASIC). The microprocessor-based software is more easily updated or changed to add functionality. Additionally, it extends to transmission functions the use of $3^{rd}$ level coherency monitoring algorithms that already exist for engine functions while still keeping the systems independent. Further, the present disclosure minimizes unique development with respect to electronic transmission control with a less complex design.

The present disclosure provides transmission control unit watchdog functionality. Specifically, the present disclosure includes a hardware-based, independently clocked, microprocessor-based monitoring unit to monitor the main microprocessor in the electronic transmission control unit. The monitoring unit monitors the microprocessor in the electronic transmission control unit to determine that the microprocessor unit is functioning properly. As well, the transmission control unit can test the monitoring unit device to ensure that it can properly detect a malfunctioning microprocessor. It does this through an intention ally complicated set of handshaking between the microprocessor and the monitoring unit. The monitoring unit also includes some auxiliary functions like other inputs and outputs, and the reset functionality. The monitoring unit of the present disclosure performs a microprocessor watchdog coherency monitoring, transmission relay power output control, undervoltage detection, and the transmission delay counter and the associated logic in that device.

The watchdog coherency monitoring block determines whether the microprocessor is capable of properly controlling the transmission. If this watchdog monitor is violated, then a transmission delay counter is initiated. If the watchdog monitor detect cannot be met while the transmission delay counter is counting towards its final value, then the delay eventually times out and the transmission relay power output is turned off. If the coherency monitoring is met before the delay counter times out, then the delay counter is reset to its normal state, and monitoring continues. If the delay counter times out and the power is turned off, then some external circuitry provides a signal back to the LATCHDOWN pin of the monitoring unit that prevents the transmission relay power output from energizing. Hence the relay output power is "latched down."

The transmission relay power is used to energize the solenoids in the transmission itself. When the relay power is removed from the transmission, the transmission goes to a default mode (usually $2^{nd}$ gear or $3^{rd}$ gear) called limp-in. The transmission power is required to be latched down if the monitoring unit determines that the microprocessor is malfunctioning because a malfunctioning microprocessor can damage the transmission if inappropriate drive signals are applied to its solenoids. The transmission delay counter is preset to a timeout value of 570 msec, which is an amount of time that has been determined that the microprocessor can be malfunctioning before damage to the transmission can occur. Alternatively, the timeout value can be modified as required. During the transmission delay counter timeout the microprocessor can detect that a fault is maturing. The microprocessor is configured to detect this signal then take appropriate measures to get the monitoring intact again. Essentially, the transmission delay counter allows a small amount of microprocessor malfunctioning as long as it does not effect transmission operation.

Figure 5:
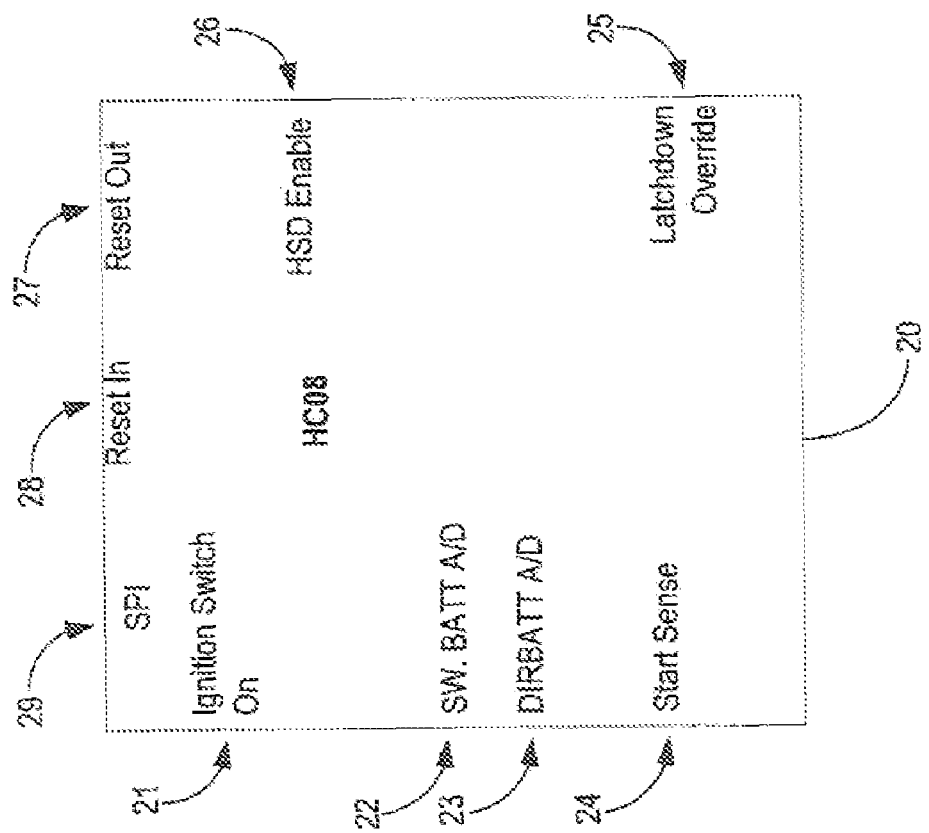
FIG. 5 is a partial pin diagram of a 68HC08 microprocessor according to an exemplary embodiment of the present disclosure.
Figure 4:
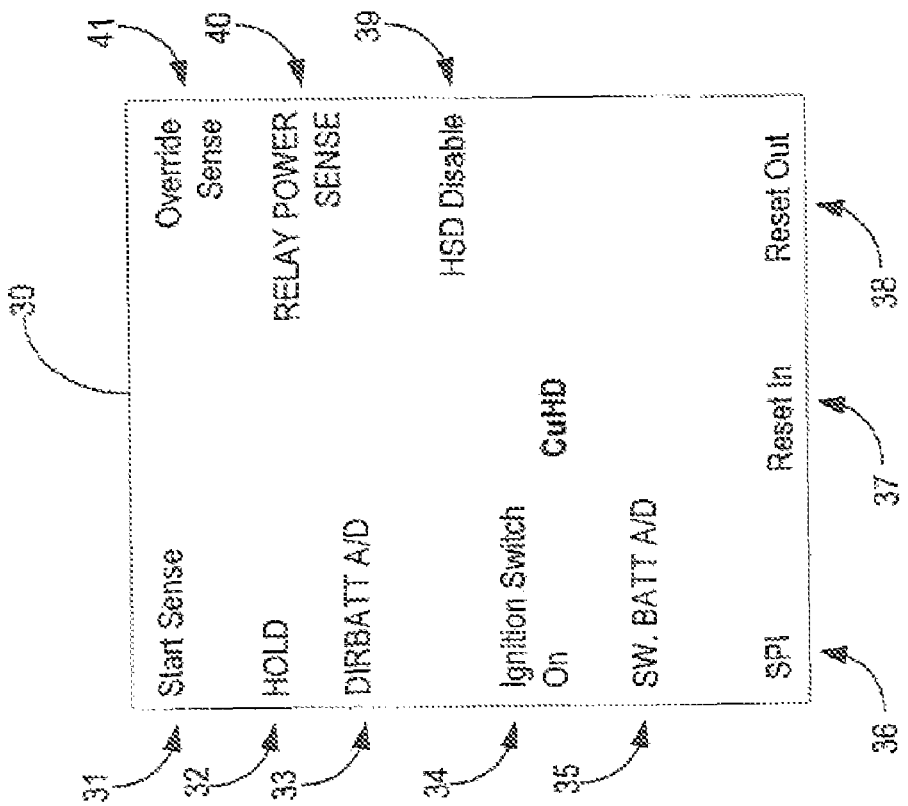
FIG. 4 is a partial pin diagram of a Copperhead (CuHD) microprocessor according to an exemplary embodiment of the present disclosure.

Referring to FIGS. 1 through 5, a monitoring unit system 5 includes a Multi-Voltage Automotive Power Supply Integrated Circuit (MAPSIC) 10, a 68HC08 microprocessor 20, a Copperhead (CuHD) microprocessor 30, and a high-side driver 50 according to an exemplary embodiment of the present disclosure. The 68HC08 and the CuHD microprocessors 20 and 30 are both manufactured by Freescale Semiconductor of Austin, Tex., for example. The CuHD microprocessor 30 is a derivative of the Freescale MPC5554 family of processors, for example. FIGS. 2 through 5 illustrate the pin functionality for the components 10, 20, 30, and 50 which are pertinent to the operation of die monitoring unit system 5. Not all pins are unique to the monitoring unit. In general, no extra pins are required from the CuHD 30 to perform these functions. The 68HC08 20 requires five extra pins to support this function. The present disclosure is shown with the MAPSIC 10, 68HC08 20, and CuHD 30 for illustration purposes, and those of ordinary skill in the art will recognize the foregoing functions can be implemented with other integrated circuits (ICs). ASICs, microprocessors, and the like.

The MAPSIC 10 is a custom-designed ASIC operable to integrate various circuits for use in switch mode pre-regulators and linear post-regulators. The MAPSIC 10 is designed to be utilized in power/train circuits, e.g. transmission control, where operation at high temperature is of prime importance. Generally, the MAPSIC 10 is configured to integrate synchronous buck switching regulator control logic with internal power switches, a stand-by regulator, a low dropout 3.3V current limited regulator, two low dropout 5.0V current limited regulators, two low dropout 5.5V current limited tracking regulators, and start, wake, reset, start-up delay and natural vacuum leak detect switch logic and timers.

A BATT pin 11 provides a battery input which provides power to the regulators in the MAPSIC 10, and the BATT pin 11 connects to a direct battery 60. The BATT pin 11 also provides a reference for an ignition key switch transition threshold. A WAKE pin 12 provides a power supply wake up input from sources other than the ignition key switch, such as for example from a CAN bus and from a Remote Start source. A START pin 13 receives an ignition switch input from an OFF/RUN/START or RUN/START Ignition Switch On signal 61. A rising edge detected on the signal 61 turns on the MAPSIC 10 power supplies, and the detected edge also initiates a 450 msec to 550 msec output low pulse on a 500 msec START Pulse pin 18. The 550 msec maximum is purposely set below the 570 msec time determined to cause transmission performance issues. The MAPSIC 10 power supplies will remain on always whenever the START pin 13 is high, and can remain on after the START pin 13 goes low if the CuHD 30 microcore commands the MAPSIC 10 to stay on through a HOLD pin 14. The HOLD pin 14 is an input pin from the CuHD 30 that maintains the power supply ON when this signal is high. A ground pin 15 connects the MAPSIC 10 to ground.

A +5V OUT pin 19 is a regulated output of the MAPSIC 10 providing power to the microprocessors 20 and 30 and module discreet components 70 and 71. The high side driver 50 cannot he enabled unless the +5V OUT pin 19 is functioning. The 500 msec START Pulse pin 18 is an open collector output which is normally high impedance, and gets pulled low upon detection of a valid low-to-high transition on the START pin 13. If a START pin 13 low-to-high transition occurs, then the pin 18 gets pulled low for 450 msec to 550 msec. The output of pin 18 goes to each microprocessor 20 and 30 to provide information as to the cause of a digital core reset. If the digital cores were reset from a MAPSIC 10 "key-on" event then this signal, which should be high when the microprocessors 20 and 30 wake up from reset, lets the microprocessors 20 and 30 know they can try to energize an Electronically Controlled Automatic Transaxle (EATX) relay 80. This signal does not go low for a MAPSIC 10 turn on due to remote start input. The output low from the pin 18 also provides a latchdown override signal to the discreet logic.

Optionally, a latchdown override pin 17 provides an open collector output that would pull down whenever the BATT pin 11 was below a certain threshold level. Otherwise the pin 17 would remain high impedance. The positive going battery threshold to turn on the output is 9.0 to 10.0 volts. And, the negative going battery threshold to turn off the output is 6.7 to 7.7 volts. A power supply reset pin 16 provides an open collector reset which pulls down whenever the MAPSIC 10 power supplies are out of regulation. For a power up, the power supply reset pin 16 pulls low until regulation is reached, and on power down, the output of pin 16 pulls low as soon as the command to turn off occurs. This pin 16 puts the microprocessors 20 and 30 into reset when it is outputting a low level. Pins 26 and 39 on the microprocessors 20 and 30 that drive a high side driver enable pin 51 are configured as inputs when the power supply reset pin 16 is pulled low so the high side driver 50 is always off.

The CuHD 30 microprocessor is a 32-bit embedded controller utilized for applications requiring complex, real-time control Any microprocessor can be used for this application provided it has similar pin characteristics of the CuHD 30. A START Pulse Sense pin 31 is an input which detects when the MAPSIC 10 is overriding latchdown due to an ignition key turn on. The pin 31 is connected to the 500 msec START Pulse pin 18, along with a resistor 62 connected to +5V. If the CuHD 30 detects an ignition key turn on then it should initiate its high side driver turn on routine. This input is normally high, and it goes low for 450 msec to 550 msec after the MAPSIC 10 detects an ignition key tarn on event. This low-time duration affords the CuHD 30 and 68HC08 20 microprocessors enough time to determine whether they should turn on the high side driver 50. The CuHD 30 and 68HC08 20 require this signal as well as the Ignition Switch On signal 61 to determine whether to enter the high side driver 50 turn on routine after each reset event.

The DIRBATT A/D pin 33 is an analog input which is used by the CuHD 30 for, among other things, determining when to enter transmission low voltage operation mode. When in this mode the CuHD 30 will need to expect that the EATX relay 80 may open when the system 5 is trying to energize the relay. If the relay 80 is open and transmission low voltage mode is present, the system 5 is allowed to override the resultant latchdown condition due to the under-energized EATX relay 80. The CuHD 30 should be monitoring the 68HC08 20 during this time to determine whether it sees the same battery condition via a communication Serial Peripheral Interface Bus (SPI) 29 and 36 link. If they both agree, then the 68HC08 20 can override latchdown condition by bringing its Latchdown override pin 25 to an output low. The battery voltage level for exiting transmission low voltage mode for a rising battery is from 9.0 to 10.0 volts. The battery voltage level for entering into transmission low voltage mode for a decreasing battery is 6.7 to 7.7 volts.

A Ignition Switch On Sense pin 34 is an input which determines the state of the ignition key, i.e. pin 34 is connected to Ignition Switch On signal 61. When this input goes from low to high, the CuHD 30 should initiate the software sequence to turn on the high side driver 50. If coming out of reset the microprocessors 20 and 30 see pin 34 high initially, then they must use the 500 msec Start Sense input 31 and 24 to determine whether the ignition key was just turned on. When pin 34 input is high the two micros should always evaluate whether conditions warrant turning on the high side driver 50. When pin 34 input goes low the CuHD 30 will determine when to torn off the high side driver 50. Under certain conditions the CuHD 30 will want to keep the high side driver 50 turned on when pin 34 input goes low. The CuHD 30 should not try to turn on the high side driver 50 if it is already off while this input is low, and it cannot turn it on at this point if latchdown is active.

A SW BATT A/D pin 35 is a Trans Switched Battery 63 analog input. This analog input determines the battery level of the output of the EATX relay 80. This input determines, among other things, whether the EATX system is in limp-in. If the EATX system is not in the transmission low voltage operation mode, then the EATX system is in limp-in if the decoded level seen at this input is less than 3.0 volts for a certain period of time. If the system is in transmission low voltage operation mode, then the EATX may be in limp-in if this input is less than 3.0 volts for a certain period of time, or it may not be in limp-in if the system has not previously determined limp-in.

A HSD Disable pin 39 is an Input/Output port which can monitor the state of the high side driver enable 51 signal when configured as an input, plus when configured as an output it can output a low signal to disable the high side driver 50. When the CuHD 30 determines that the transmission system must enter limp-in mode it should ensure the HSD Disable pin 39 is at an output low. An Override Sense input 41 is an input-only pin winch can sense the status of the latchdown override node. Pin input 41 is used in conjunction with the Start Sense pin 31 to determine whether the latchdown override is being asserted from the 68HC08 20. If the CuHD 30 detects an improper latchdown override it can pull the HSD disable pin 39 low to tarn off the high side driver 50 if so required. A HOLD pin 32 is an output pin which is tri-stated on reset. The CuHD 30 asserts the pin 32 high when it needs the MAPSIC 10 power supply to remain ON.

Both the CuHD 30 and 68HC08 20 microprocessors are connected to $3^{rd}$ Level Circuits which include the SPI communication link 29 and 36, a reset input 28 and 37, and a reset output 27 and 38. Using these pins 27, 28, 29, 36, 37, and 38, each microprocessor 20 and 30 can reset the other one and itself if it cannot determine whether the other microprocessor 20 and 30 is operating properly, i.e., watchdog messages are exchanged between the microprocessors 20 and 30. Additionally, the $3^{rd}$ Level Circuits are configured to handle watchdog functionality of the pulse train and fault, as well as delay monitoring. These $3^{rd}$ Level Circuits already exist for engine functions. The present disclosure extends the use of these $3^{rd}$ Level Circuits to transmission functions while keeping this independent from the engine functions. Each microprocessor 20 and 30 uses a general purpose digital port that is configured as an output to assert a reset to the common reset node that is connected to the Reset input 28 and 30 of both microprocessors 20 and 30. Additionally, a One-shot circuit ears be include between the such that neither microprocessor 20 and 30 can hold the other in reset indefinitely.

The 68HC08 20 microprocessor is an 8-bit microcontroller. The 68HC08 20 microprocessor includes some of the same pins as the CuHD 30. Any microprocessor can be used for this application provided it has similar pin characteristics of the 68HC08 20. A START Pulse Sense 24 is an input which detects when the MAPSIC 10 is overriding latchdown due to an ignition key turn on. If the 68HC08 20 detects an ignition key turn on then it should initiate its high side driver 50 turn on routine. This input is normally high, and it goes low for 450 msec to 550 msec after the MAPSIC 10 detects an ignition key turn on event. This low-time duration affords the CuHD 30 and 68HC08 20 enough time to determine whether they should turn on the high side driver 50. The CuHD 30 and 68HC08 20 require this signal as well as an Ignition Switch On 21 and 34 to determine whether to enter the high side driver 50 turn on routine after each reset event.

A DIRBATT A/D pin 23 is an analog input which is used by the 68HC08 20 for, among other things, determining when to enter transmission low voltage operation mode. When in this mode the 68HC08 20 will need to expect that the EATX relay 80 may open when the system 5 is trying to energize the relay.

If the relay 80 is open and transmission low voltage mode is present, the system 5 is allowed to override the resultant latchdown condition due to the under-energized EATX relay 80. The 68HC08 20 should be monitoring the CuHD 30 during this time to determine whether it sees the same battery condition via the communication SPI 29 and 36 link. If they both agree, then the 68HC08 20 can override the latchdown condition by bringing its Latchdown Override pin 25 to an output low. The battery voltage level for exiting transmission low voltage mode for a rising battery voltage is from 9.0 to 10.0 volts. The battery voltage level for entering into transmission low voltage mode for a decreasing battery voltage is 6.7 to 7.7 volts.

The Ignition Switch On pin 21 is an input which determines the state of the ignition key. When this input goes from low to high, the 68HC08 20 should initiate the software sequence to turn on the high side driver 50. If coming oat of reset the CuHD 30 and 68HC08 20 see this input high initially, then they must use the 500 msec START signal 24 and 31 to determine whether the ignition key was just turned on. When this input is high the CuHD 30 and 68HC08 20 should always evaluate whether conditions warrant turning on the high side driver 50. When this input goes low the 68HC08 20 micro will determine when to turn off the high side driver 50. Under certain conditions the CuHD 30 will want to keep the high side driver 50 turned on when this input goes low. The 68HC08 20 is able to detect this and keep its HSD enable pin 26 powered until it is commanded by the CuHD 30 to turn off the high side driver 50. Note that any time the high side driver 50 is to be enabled by the 68HC08 20 it must have satisfactory communication with the CuHD 30, otherwise it must disable the high side driver 50 by bringing the HSD Enable pin 26 low. The 68HC08 20 does not try to turn on the high side driver 50 if it is already off white the Ignition Switch On signal 21 is low.

A SW BATT A/D pin 22 is a Trans Switched Battery 63 analog input. This analog input 22 determines the battery level of the output of the EATX relay 80. This input determines, among other things, whether the EATX system is in limp-in. If the EATX system is not in the transmission low voltage operation mode, then the EATX system is in limp-in if the decoded level seen at this input is less than 3.0 volts for a certain period of time. If the system is in transmission low voltage operation mode, then the EATX may be in limp-in if this input is less than 3.0 volts for a certain period of time, or it may not he in limp-in if the system has not previously determined limp-in. The HSD Enable pin 26 is an output port which tries to enable the high side driver 50 if software determines that conditions are correct for energizing the EATX relay 80. When the 68HC08 20 determines that the transmission system must enter limp-in mode it should ensure its HSD Enable pin 26 is at an output low.

The High Side Driver 50 includes the high side driver enable pin 51 which is enabled when the input is at a threshold voltage level, a direct battery pin 54, a ground pin 52, and an output pin 53. The output pin 53 connects to relay power 64 and to the EATX relay 80. The EATX relay 80 provides power to the transmission actuators, e.g. transmission solenoids. The EATX relay output connects/disconnects the transmission actuators to the vehicle battery positive.

As described herein, the monitoring unit system 5 operates within a transmission controller system. Initially at battery power up, an unpowered and non-initialized digital system 5 will not output the required high-level signal to the enable pin 51 of the high side driver 50, so the driver 50 will remain powered off no matter whether the high-side driver 50 gets its battery power before or after the rest of the system 5. There are two methods of powering up the system 5. The system 5 is powered up through an ignition key switch turn-on and a possible remote-start turn on. In the case of a remote-start turn on the microprocessors 20 and 30 power up and perform third level functions, but the high side driver 50 does not power up. Each microprocessor 20 and 30 monitors their ignition. Switch On signals 21 and 34 and 500 msec START sense inputs 31 and 24 to initiate the high side driver 50 start up sequence. During the actual key on event the microprocessors 20 and 30 attempt to enable the high side driver 50 because the power supply is overriding latchdown during the 500 msec START pulse 18. The microprocessors 20 and 30 do not attempt to turn on the high side driver 50 during this initial key-on event if they deem it unsafe to turn it on.

Initial key switch occurs when the system 5 powers tip due to an ignition key turn on, then the key off to on transition is missed because this event occurs before the power supplies power up and initiate the microprocessors 20 and 30. In this case the 500 msec START sense signal 18 can be used to determine whether a key on event powered up the system 5 when coming out of reset. If the 500 msec START sense 18 is high and the ignition Switch On signals 21 and 34 is high and all is okay to turn on the high side driver 50, then each microprocessors 20 and 30 can attempt to turn on the high side driver 50 because the latchdown signal 25 is being overridden by the 500 msec START sense signal 18. Since the 500 msec START signal 18 timeout commences with the key on event, care must be taken to ensure that the high side driver 50 gets turned on before the 500 msec START signal 18 times out and latches the high side driver 50 down. Prudent operation requires that the 68HC08 20 Latchdown override pin 25 remain as an input to not provide its own latchdown override. The CuHD 30 can monitor proper operation of the latchdown override by sensing the 500 msec START signal 18 as well as the Latchdown Override Output 25 of the 68HC08 20.

The system 5 is not designed to be reset by hardware upon every ignition key on event. Therefore, the microprocessors 20 and 30 are capable of powering up the high side driver 50 after any ignition key on event provided that everything is okay. This requires continual monitoring of the 500 msec START pulse sense 18 and the ignition Switch On signals 21 and 34 that indicate the ignition key on event. Even after the microprocessors 20 and 30 have declared a limp-in condition, they should monitor the inputs that sense the key-on. Each key-on provides a clean start where the system can be re-evaluated for proper operation. Therefore, each key-on shall restart the high side driver 50 by driving the 68HC08 HSD Enable pin 26 high. The CuHD 30 shall also not drive its HSD Disable pin 39 low unless it requires to do so due to some malfunction indicated after the key-on. After any ignition key-on the 500 msec START pulse signal 18 overrides latchdown, so asserting the HSD Enable 26 turns on the high side driver 50. Hence, each key on sequence, and only a key on sequence, allows the system to restart with a clean slate.

The EATX relay 80 is maintained on whenever the 68HC08 20 outputs a high level on its HSD Enable pin 26 and no latchdown signal is present or the CuHD 30 does not want to disable the relay 80 by outputting a low on its HSD Disable pin 39. No specific watchdog function is required for maintaining the relay 80. The third level checks (i.e., third level circuit pins 27, 28, 29, 36, 37, and 38) are sufficient for maintaining watchdog operation. The resetting of the microprocessors 20 and 30 due to third level checks performs the operation of the watchdog window detect and transmission fault delay functions of the present system 5. While the key is on and the 68HC08 20 perceives everything to be okay, then it always drives its HSD Enable pin 26 high. The microprocessor resetting feature based on a watchdog failure is an optional watchdog failure response in addition to the relay shutdown response.

If a third level reset is required, the system 5 automatically performs the task of disabling die high side driver 50 by the reset release of the HSD enable pin 26 on the 68HC08 20. No other pin can pull up on the high side driver input pin 51, so this is sufficient for disabling the high side driver 50. If for some reason the 68HC08's HSD Enable pin 26 gets stuck high, then the CuHD 30 needs to determine this and disable the high side driver 50 until latchdown can prevent the 68HC08 20 from turning on the high side driver 50. If for some reason both the 68HC08's HSD Enable 26 pin is stuck high and its Latchdown Override pin 25 is in Override mode, then the CuHD 30 can still assert its HSD Disable pin 39 to turn off the high side driver 50. However, this disable signal does not survive the third level reset situation. If this situation is deemed unacceptable, then the option of providing the latchdown override 17 from the MAPSIC 10 must be invoked.

The two microprocessors 20 and 30 can be required to maintain the EATX relay 80 on after the ignition key has been turned off if the CuHD 30 determines that it is not okay to turn the relay 80 off. Third level communications is maintained during the timeframe when the key is off and the relay 80 must be maintained on. Functions are similar to the key on situation except when the CuHD 30 declares that the relay 80 can be turned off, it will command the 68HC08 20 to pull its HSD Enable 26 low (this is required so a CuHD 30 reset does not allow the high side driver 50 to turn on again). The CuHD 30 also asserts its HSD disable pin 39 low.

If a third level reset is required when the key is off, then disabling the high side driver 50 is automatic through the release of the HSD enable pin 28. No other pin can pull up on the high side driver input pin 51, so this is sufficient for disabling the high side driver 50. Note that in this system 5 neither 68HC08 20 loss of ground or loss of power supply will result in this situation.

The system 5 allows software to test the external EATX relay's 80 capability to torn on and turn off by command of the microprocessors 20 and 30. The relay 80 tests are performed within the first 500 msec of the key on event by being performed during the 500 msec START pulse 19 timeout. After a reset or an ignition key-on, the microprocessors 20 and 30 determine that it is okay to enable the high side driver 50. If all is okay, then the 68HC08 20 asserts its HSD Enable pin 26. The speed at which the system 5 resets can occur is much faster than the response of an electromechanical relay. So, the two microprocessors 20 and 30 can go through a reset sequence and initialize to find the EATX relay 80 still energized (as perceived by the Trans switched battery analog input). Coming out of reset the two microprocessors 20 and 30 must agree on what to do with the EATX relay 80. Under normal circumstances the microprocessors 20 and 30 will want to try to energize the EATX relay 80. If so, then the relay 80 must be tested.

The CuHD 30 performs the EATX relay 80 tests. In an EATX system a key ON event can occur when the relay 80 is either off or on. As well, a third level reset can occur when the relay 80 is off or on. So, depending on the state of the relay 80 upon key-on or reset, a different sequence of events must occur. If the EATX relay 80 is off, then the CuHd 30 determines that it can turn ON the relay 80, turn OFF the relay 80, and then turn the relay 80 back ON for normal operation. The CuHD 30 handles this by exercising its HSD Disable pin 39 and waiting for the SWBATT 35 feedback. This is accomplished while the 500 msec START pulse 18 is in progress. If the EATX relay 80 is on, then the CuHd 30 needs to determine that it can turn the relay 80 OFF and then turn the relay 80 back ON for normal operation. The CuHD 30 handles this by exercising its HSD Disable pin 39 and waiting for the SWBATT 35 feedback. This is accomplished while the 500 msec START pulse 18 is in progress.

Limp-in will be declared by the CuHD 30 when it detects a fault condition in the EATX system. If the CuHD 30 decides to go into the limp-in state it merely makes its HSD Disable pin 39 an output low.

Discrete circuit components 70 provide a latchdown circuit which includes outputs from the MAPSIC 10, 68HC08 20, and Trans Switched Battery 63 to selectively disable the high side driver 50 by forcing its input pin 51 low. Discrete circuit components 71 provide a transmission master kill function when the CuHD HSD Disable pin 39 is configured as an output low. The CuHD HSD Disable pin 39 can be made an input or an output high to allow the HSD enable pin 26 to control the high side driver 50 by the 68HC08 20. A scaling and filter circuit 90 is included between various pins of the MAPSIC 10, 68HC08 20, and CuHD 30 and the Ignition Switch On signal 61, the Trans Switched Battery 63, and the Direct Battery 60.

Although the present disclosure has been illustrated and described herein with reference to preferred embodiments and specific examples thereof it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A transmission power relay output circuit with a latchdown mechanism for automotive use, comprising:
    a power supply integrated circuit connected to a power source, a first microprocessor, and a second microprocessor;
    a communications link for exchanging watchdog messages between the first and second microprocessors;
    a high side driver comprising an input from the first and second microprocessors, and an output coupled to a transmission relay; and
    a latchdown circuit connected to the power supply integrated circuit, the first and second microprocessors, and the high side driver, wherein the latchdown circuit comprises a plurality of discrete components;
    wherein the first and second microprocessors and the latchdown circuit are configured to control the transmission relay in the event that one of the first and second microprocessors decides it is appropriate to de-energize the relay.

2. The transmission power relay output circuit of claim 1, wherein the communications link comprises a Serial Peripheral Interface Bus.

3. The transmission power relay output circuit of claim 1, wherein the first and second microprocessors reset one another and itself responsive to a software algorithm that contains third level protection functions.

4. The transmission power relay output circuit of claim 1, wherein the first microprocessor comprises a 68HC08 and the second microprocessor comprises a Copperhead (CuHD).

5. The transmission power relay output circuit of claim 4, wherein the Copperhead microprocessor detects an ignition key turn on and initiates a high side driver turn on routine accordingly.

6. The transmission power relay output circuit of claim 1, wherein the transmission relay is de-energized responsive to a fault condition comprising one of when the first or second microprocessors stops sending a proper watchdog signal/message, and the latchdown circuit prevents re-energization of the relay until the next key on sequence.

7. The transmission power relay output circuit of claim 6, wherein once the transmission relay has been de-energized from one of the fault conditions, the relay is not reactivated until the ignition key is cycled through lock back to on even if the first or second microprocessor gets reset.

8. The transmission power relay output circuit of claim 7, wherein the transmission relay is energized as long as the first microprocessor maintains an enable output, no latchdown signal is present, and the second microprocessor maintains a disabled output low.

9. The transmission power relay output circuit of claim 1, wherein the first and second microprocessors are configured to perform a test by resetting, and wherein the resetting is performed fast enough that the relay remains energized.

10. A first and second microprocessor configured to control a transmission power relay output circuit with a latchdown mechanism for automotive use, comprising:
    a Serial Peripheral Interface Bus communications link between the first and second microprocessors;
    a high side driver comprising an input from the first and second microprocessors, and an output coupled to a transmission relay; and
    a latchdown circuit connected to a power supply integrated circuit, the first and second microprocessors, and the high side driver, wherein the latchdown circuit comprising a plurality Of discrete components;
    wherein the Serial Peripheral Interface Bus communications link allows the first and second microprocessors to reset one another and itself responsive to whether the first and second microprocessors are operating properly, wherein the first and second microprocessors reset one another and itself responsive to a software algorithm that contains third level protection functions;
    wherein the first and second microprocessors and the latchdown circuit are configured to control a transmission relay in the event that one of the first and second microprocessors decides it is appropriate to de-energize the relay.

11. The first and second microprocessor of claim 10, wherein the first microprocessor comprises a 68HC08 and the second microprocessor comprises a Copperhead (CuHD).

12. The first and second microprocessor of claim 11, wherein the Copperhead microprocessor detects an ignition key turn on and initiates a high side driver turn on routine accordingly.

13. The first and second microprocessor of claim 11, wherein the transmission relay is de-energized responsive to a fault condition comprising one of when the first or second microprocessors stops sending a proper watchdog signal/message, and the latchdown circuit prevents re-energization of the relay until the next key on sequence.

14. The first and second microprocessor of claim 13, wherein once the transmission relay has been de-energized from one of the fault conditions, the relay is not reactivated until the ignition key is cycled through lock back to on even if the first or second microprocessor gets reset.

15. The first and second microprocessor of claim 14, wherein the transmission relay is energized as long as the first microprocessor maintains an enable output, no latchdown signal is present, and the second microprocessor maintains a disabled output low.

16. The first and second microprocessor of claim 10, wherein the first and second microprocessors are configured to perform a test by resetting, and wherein the resetting is performed fast enough that the relay remains energized.

* * * * *